(12) United States Patent
Sun et al.

(10) Patent No.: US 11,960,479 B2
(45) Date of Patent: Apr. 16, 2024

(54) PROCESSING ITERATIVE QUERY CONSTRUCTS IN RELATIONAL DATABASES

(71) Applicant: Huawei Technologies Co., Ltd., Guangdong (CN)

(72) Inventors: Yang Sun, Palo Alto, CA (US); Sofoklis Floratos, Columbus, OH (US); Ahmad Ghazal, Redondo Beach, CA (US); Jianjun Chen, Cupertino, CA (US); Xiaodong Zhang, Columbus, OH (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/050,913

(22) Filed: Oct. 28, 2022

(65) Prior Publication Data

US 2023/0083420 A1 Mar. 16, 2023

Related U.S. Application Data

(63) Continuation of application No. PCT/US2020/070011, filed on Apr. 30, 2020.

(51) Int. Cl.
*G06F 16/242* (2019.01)
*G06F 11/34* (2006.01)
(Continued)

(52) U.S. Cl.
CPC ...... *G06F 16/2425* (2019.01); *G06F 11/3409* (2013.01); *G06F 16/2282* (2019.01); *G06F 16/24544* (2019.01)

(58) Field of Classification Search
CPC .......... G06F 16/2425; G06F 16/24544; G06F 16/2282; G06F 11/3409
See application file for complete search history.

(56) References Cited

U.S. PATENT DOCUMENTS 11,829,363 B2 * 11/2023 Freedman ......... G06F 16/24535
2014/0181074 A1 * 6/2014 Ghazal ............. G06F 16/24542
707/718
(Continued)

FOREIGN PATENT DOCUMENTS

WO WO-9809238 A1 3/1998
WO WO-2021067977 A1 4/2021

OTHER PUBLICATIONS

"International Application Serial No. PCT/US2020/070011, International Search Report dated Oct. 7, 2020", 5 pgs.
(Continued)

*Primary Examiner* — Huawen A Peng
(74) *Attorney, Agent, or Firm* — Schwegman Lundberg & Woessner, P.A.

(57) ABSTRACT

A method for functionally rewriting iterative queries for a relational database management system (RDBMS) is provided. The method comprises receiving a first iterative query, the first iterative query having a first non-iterative part that defines a first main table and a first iterative part that generates values in rows of a first working table based on values in rows of the first main table, determining that the first iterative part modifies all of the rows of the first working table, and rewriting the first iterative part, including: adding a renaming operation to rename the first working table to a new first main table and to rename the first main table to a new first working table, adding a first Delete operation to delete each row of the new first working table, and adding a first loop operation to repeat the first iterative part until a first termination condition is met.

20 Claims, 6 Drawing Sheets

(51) Int. Cl.
    *G06F 16/22*         (2019.01)
    *G06F 16/2453*     (2019.01)

(56) References Cited

U.S. PATENT DOCUMENTS

| | | | | |
|---|---|---|---|---|
| 2014/0181078 | A1* | 6/2014 | Ghazal | G06F 16/24542 |
| | | | | 707/718 |
| 2014/0181079 | A1* | 6/2014 | Ghazal | G06F 16/24535 |
| | | | | 707/718 |
| 2017/0116271 | A1 | 4/2017 | Ziauddin et al. | |
| 2020/0110827 | A1* | 4/2020 | Freedman | G06F 16/24542 |

OTHER PUBLICATIONS

"International Application Serial No. PCT/US2020/070011, Written Opinion dated Oct. 7, 2020", 5 pgs.
Onizuka, Makoto, et al., "Optimization for iterative queries on MapReduce", Proceedings of the VLDB Endowment; [ACM Digital Library], Assoc. of Computing Machinery, New York, NY, vol. 7, No. 4, (Dec. 1, 2013), 241-252.

\* cited by examiner

PROCESSING ITERATIVE QUERY CONSTRUCTS IN RELATIONAL DATABASES

CROSS-REFERENCE TO RELATED APPLICATIONS

This application is a continuation of International Application No. PCT/US2020/070011, filed on Apr. 30, 2020, entitled "PROCESSING ITERATIVE QUERY CONSTRUCTS IN RELATIONAL DATABASES," the benefit of priority of which is claimed herein, and which application is hereby incorporated herein by reference in its entirety.

TECHNICAL FIELD

The present disclosure is related to techniques for an iterative query construct for a relational database and a method for processing an iterative query construct within a relational database system.

BACKGROUND

Relational database management systems (RDBMSs) store data as tuples (rows) that are grouped into relations (tables) that have distinct attributes (columns). The main objective of the relational model is to hide the complexity of how data should be processed and focus instead on what data should be returned to the user. To achieve that, the vast majority of RDBMSs access data in the RDBMSs using Structured Query Language (SQL). RDBMSs parse, analyze, and optimize SQL statements in order to generate an execution plan. Finally, RDBMSs execute the plan and return the resulting tuples to the user in order to answer the query.

SUMMARY

Various examples are now described to introduce a selection of concepts in a simplified form that is further described below in the detailed description. The Summary is not intended to identify key or essential features of the claimed subject matter, nor is it intended to be used to limit the scope of the claimed subject matter.

A relational database management system (RDBMS) processes iterative queries, such as iterative Common Table Expressions (CTEs) or iterative views, through changes in the functional rewrite processes of the RDBMS. The functional rewrite adds either a rename operation or an Update operation at the end of a first iterative part of the query. The added rename operation swaps memory used by a main table with the memory used by a working table and is used when the iterative part modifies all rows of the working table. The Update operation is used when only some of the rows of the working table were modified and transfers those rows to the main table. The functional rewrite also adds operations at the end of the iterative part, after the rename or Update operation, to conditionally branch back to the first operation in the iterative part when a termination condition is not met and to terminate the iterative part when the termination condition is met.

According to a first aspect, a method for functionally rewriting iterative queries for a relational database management system (RDBMS) functionally rewrites a first query that operates on a first main table defined by a first non-iterative part of a first iterative query and a first working table, defined by a first iterative part of the first query. The rewriting of the query determines that the iterative part modifies all of the rows of the first working table and adds a renaming operation to rename the first working table to a new first main table and to rename the first main table to a new first working table. The functional rewrite also adds a first Delete operation to delete each row of the new first working table and adds a loop operation to repeat the iterative part until a first termination condition is met.

According to a first implementation of the first aspect as such, the loop operation adds a first comparison operation and a first branch operation as last operations in the first iterative part. The first comparison operation tests a first termination condition and the first branch operation branches to a first operation in the first iterative part when the first termination condition is not met. The first comparison operation terminates the first iterative part when the first termination condition is met.

According to a second implementation of the first aspect as such, the rewriting of the first iterative part includes adding the first renaming operation and the first Delete operation immediately before the first comparison operation.

According to a third implementation of the first aspect as such, the method functionally rewrites a second iterative query that includes a second non-iterative part that defines a second main table and a second iterative part that generates values in rows of a second working table based on values in rows of the second main table. The functional rewrite determines that the second iterative part modifies less than the all of the rows of the second working table and adds an Update operation, to replace corresponding rows in the second main table with the modified rows from the second working table. The rewrite also adds a second Delete operation to delete each modified row of the second working table.

According to a fourth implementation of the first aspect as such, the functional rewrite adds a second comparison operation and a second branch operation as last operations in the second iterative part. The second comparison operation tests a second termination condition and the second branch operation conditionally branches to a first operation in the second iterative part when the second comparison operation determines that the termination condition is met and terminates the second iterative part when the termination condition is not met. The functional rewrite adds the Update operation and the second Delete operation immediately before the second comparison operation.

According to a fifth implementation of the first aspect as such, the first termination condition includes a number of iterations to be performed by the first iterative part. The functional rewrite initializes a counter and the first comparison operation compares a value of the counter to the number of iterations.

According to a sixth implementation of the first aspect as such, the first termination condition includes an expression to be evaluated by the first iterative part. The first comparison operation evaluates the expression to determine whether the first termination condition is met.

According to a seventh implementation of the first aspect as such, the first termination condition includes a difference measurement between first values of target entries from the first main table for a previous iteration and second values of the target entries from the first main table for a current iteration. The functional rewrite adds an operator to store the first values of the target entries from the first main table as a first operation of the first iterative part. The first comparison operation determines whether a difference between the second values of the target entries from the first main table and the stored first values of the target entries is less than the difference measurement wherein the first comparison operation determines whether the termination condition is met.

According to a second aspect, an apparatus for functionally rewriting iterative queries for a relational database management system (RDBMS) includes a memory containing program instructions and one or more processors in communication with the memory, where the program instructions condition the one or more processors to functionally rewrite a first query that operates on a first main table, defined by a first non-iterative part of the first query, and a first working table, defined by a first iterative part of the first query. The program instructions further condition the one or more processors to determine that the first iterative part modifies all of the rows of the first working table and add a renaming operation to rename the first working table a new first main table and to rename the first main table a new first working table. The program instructions also condition the one or more processors to add a first Delete operation to delete each row of the new first working table and to add a loop operation to repeat the iterative part until a first termination condition is met.

According to a first implementation of the second aspect as such, the program instructions that add the loop operation add a first comparison operation and a first branch operation as last operations in the first iterative part. The first comparison operation and the first branch operation are configured to cause the one or more processors to test a first termination condition, to branch to a first operation in the first iterative part when the first termination condition is met, and to terminate the first iterative part when the first termination condition is met.

According to a second implementation of the second aspect as such, the program instructions add the first renaming operation and the first Delete operation immediately before the first comparison operation.

According to a third implementation of the second aspect as such, the operations further include rewriting a second iterative query that has a second a non-iterative part that defines a second main table and a second iterative part that generates values of rows of a second working table based on values of rows of the second main table. The program instructions further condition the one or more processors to determine that second iterative part modifies less than the all of the rows of the second working table. The operations further include adding, to the first iterative part, an Update operation, to replace corresponding rows in the second main table with the modified rows from the second working table and a second Delete operation, to delete each modified row of the second working table.

According to a fourth implementation of the second aspect as such, the program instructions condition the one or more processors to add a second comparison operation and a second branch operation as last operations in the second iterative part. The second comparison operation tests a second termination condition and the second branch operation branch to a first operation in the second iterative part when the termination condition is not met and terminates the second iterative part when the second comparison operation determines that the termination condition is met. The program instructions condition the one or more processors to add the Update operation and the second immediately before the second comparison operation and to add the delete operation as a first operation in the second iterative part.

According to a fifth implementation of the second aspect as such, the first termination condition includes a number of iterations to be performed by the iterative part and the operations include rewriting the first iterative part to add an operation to initialize a counter. The operation of adding the first comparison operation includes adding an operation to compare a value of the counter to the number of iterations.

According to a sixth implementation of the second aspect as such, the first termination condition includes an expression to be evaluated by the iterative part and the operation of adding the first comparison operation includes adding operations to evaluate the expression to determine whether the first termination condition is met.

According to a seventh implementation of the second aspect as such, the first termination condition includes a difference measurement between first values of target entries from the first main table for a previous iteration and second values of the target entries from the first main table for a current iteration and the operations further include rewriting the first iterative part to add an operator to store the first values for the target entries from the first main table as a first operation of the first iterative part. The operation of adding the comparison operation includes adding an operation to determine whether a difference between the second values of the target entries from the first main table and the stored first values of the target entries is less than the difference measurement wherein the comparison operation determines whether the termination condition is met.

According to a third aspect, a computer-readable storage medium storing computer instructions for functionally rewriting iterative queries for a relational database management system (RDBMS). The computer instructions, when executed by one or more processors cause the one or more processors to functionally rewrite a first query that operates on a first main table, defined by a first non-iterative part of the first query, and a first working table, defined by a first iterative part of the first query. The program instructions further condition the one or more processors to determine that the first iterative part modifies all of the rows of the first working table and add a renaming operation to rename the first working table to a new first main table and to rename the first main table a new first working table. The program instructions also condition the one or more processors to add a first Delete operation to delete each row of the new first working table and to add a loop operation to repeat the iterative part until a first termination condition is met.

According to a first implementation of the third aspect as such, the loop operation adds a first comparison operation and a first branch operation as last operations in the first iterative part. The first comparison operation and the first branch operation are configured to cause the one or more processors to test a first termination condition, to branch to a first operation in the first iterative part when the first termination condition is met, and to terminate the first iterative part when the first termination condition is met.

According to a second implementation of the third aspect as such, the operations further include rewriting a second iterative query that has a second a non-iterative part that defines a second main table and a second iterative part that generates values of rows of a second working table based on values of rows of the second main table. The program instructions further cause the one or more processors to determine that second iterative part modifies less than the all of the rows of the second working table. The operations further include adding, to the first iterative part, an Update operation, to replace corresponding rows in the second main table with the modified rows from the second working table and a second Delete operation, to delete each modified row of the second working table.

According to a third implementation of the third aspect as such, the operations further include adding a second comparison operation and a second branch operation as last operations in the second iterative part. The second comparison operation is configured to cause the one or more processors to test a second termination condition and the second branch operation is configured to cause the one or more processors to conditionally branch to a first operation in the second iterative part when the second comparison operation determines that the termination condition is not met and to terminate the second iterative part when the second comparison operation determines that the termination condition is met. The operation of rewriting of the second iterative part includes adding the Update operation and the second Delete operation immediately before the second comparison operation.

According to a fourth implementation of the third aspect as such, the first termination condition includes a number of iterations to be performed by the first iterative part and the operations further comprise adding an operation to the first non-iterative part to initialize a counter. The operation of adding the first comparison operation includes adding an operation to compare a value of the counter to the number of iterations.

According to a fifth implementation of the third aspect as such, the first termination condition includes an expression to be evaluated by the first iterative part and the operation of adding the first comparison operation includes adding operations to evaluate the expression to determine whether the first termination condition is met.

According to a sixth implementation of the third aspect as such, the first termination condition includes a difference measurement between first values of target entries from the first main table for a previous iteration and the second values of the target entries from the first main table for a current iteration and the operation of rewriting the first iterative part further comprises adding an operator to store the first values of the target entries from the first main table as a first operation of the first iterative part. The operation of adding the first comparison operation includes adding an operation to determine whether a difference between the second values of the target entries from the first main table and the stored first values of the target entries is less than the difference measurement wherein the first comparison operation determines whether the termination condition is met.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
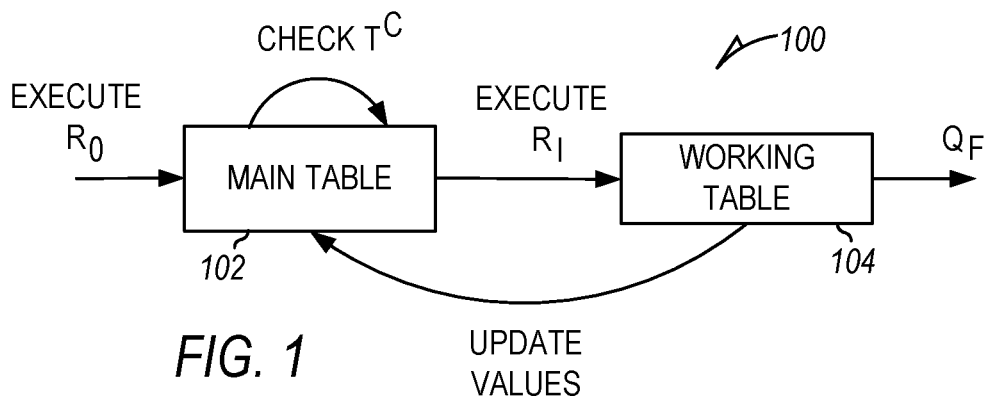
FIG. 1 is a data-flow diagram showing an iterative database construct according to an example embodiment.

It should be understood at the outset that although an illustrative implementation of one or more embodiments is provided below, the disclosed systems, methods, and/or apparatuses described with respect to FIGS. 1-7 may be implemented using any number of techniques, whether currently known or not yet in existence. The disclosure should in no way be limited to the illustrative implementations, drawings, and techniques illustrated below, including the example designs and implementations illustrated and described herein, but may be modified within the scope of the appended claims along with their full scope of equivalents.

In the following description, reference is made to the accompanying drawings that form a part hereof, and in which are shown, by way of illustration, specific embodiments that may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

Although SQL has been used for many decades and is an industry standard, it still has some limitations. For example, SQL queries cannot express iterative computations efficiently. These computations are typically used in algorithms in which one iteration receives the output data from a previous iteration as input data. Queries that use iterative processing normally use different data in each iteration, or try to estimate a particular value by executing the same query multiple times. Two representative examples are graph related problems: the Single Source Shortest Path query that computes the shortest path between two points, and the PageRank query which finds the most important nodes in a graph. The current SQL standard supports recursive processing through views or CTEs but it cannot accommodate purely iterative processing. The main limitation is the assumption that a recursive query needs to reach a fix point: a particular set of rows that satisfy the recursive relation. Thus, aggregate functions, which perform a calculation on a set of values and return a single value result, are not allowed in the recursive part of the query. The termination condition of a recursive query is implied and tuples can only be appended to the result and not updated. Currently, users who want to execute iterative queries, switch from RDBMSs to specialized graph processing engines that support custom vertex-based APIs or Datalog systems that can optimize recursive queries more effectively.

The examples below describe a native implementation of iterative CTEs in a massively parallel processing database (MPPDB) system. The native implementation provides advantages over an implementation external to the MPPDB. In particular, the native implementation ensures that Atomicity, Consistency, Isolation, and Durability (ACID) proprieties are handled by the system without the need to create long transactions. In addition, the native implementation allows the workload manager to schedule iterative CTEs in the same way as other native database operations and queries, because it generates a single execution plan that can be examined as one processing unit. Furthermore, the native implementation avoids unnecessary overhead introduced by Data Definition Language (DDL) and DML operations of an external implementation. Finally, existing query optimizations and cost estimation can be applied by the planner to the entire iterative CTE and not only to individual SQL statements that are derived from the CTE by the middleware.

CTEs have been part of the SQL standard since 1999 and are used in SQL programming to simplify complicated queries. In general, CTEs are temporarily named result sets that a user can reference within a SQL statement. CTEs also support recursive evaluation that enables users to express hierarchical queries or path traversing algorithms.

Recent research efforts have explored the possibility of extending recursive CTEs to allow aggregate functions and have proposed new SQL structures and operators that can accommodate iterative queries on relational data. One modification proposes an implementation that generates stored procedures and executes them in the RDBMSs, while another implements a middle-ware between the user and a target database engine. Both proposed frameworks, however, involve external solutions that are implemented outside the SQL system.

Although the external approach is flexible, as the user can choose their preferred database engine and avoid data transforming and loading steps, it has some limitations. First, it is hard for external solutions to maintain ACID properties for long query executions. In addition, because these constructs are external to SQL, they are translated to a sequence of basic SQL operations before being input to the workload manager of the RDBMS. The workload manager then treats each of these basic operations as a query by itself. Thus, the RDBMS cannot achieve efficiencies that may be available if the workload manager processed the query as a whole. Furthermore, the basic operations sent to the RDBMS have additional overhead. For example, intermediate results are typically explicitly defined as temporary tables that impose metadata overhead. The Data Manipulation Language (DML) used in the external approach to initialize and update these intermediate results may also increase processing overhead, as it may use locking and other transactions related to these operations, which would not be used in an internal implementation. Finally, these external based extensions cannot implement many system specific optimizations.

The examples below describe a solution that addresses these problems and limitations of the external implementations. Example embodiments extend a RDBMS to support iterative CTEs by extending all the components of the database kernel, including the parser, rewrite subsystem, planner and execution engine. Although the embodiments described below are in terms of iterative CTEs implemented in SQL, it is contemplated that they may be implemented in other iterative database constructs for example, iterative views, and/or may be implemented in other query languages than SQL. One embodiment uses an MPPDB as the RDBMS. The examples use an MPPDB, which is an Online Analytical Processing (OLAP) solution, instead of a traditional RDBMS because iterative queries are typically used in an analytical environment that is particularly suited for implementation in an MPPDB. It is contemplated, however, that the embodiments described below may be implemented in a traditional RDBMS.

The example MPPDB parser extension implements a grammar for iterative CTE's and produces a parse tree similar to the parse trees for regular and recursive CTEs. The example embodiments convert the iterative CTE specification into a logical query tree, which is still a parse tree. This conversion is done through a new rewrite rule that converts the iterative CTE to existing RDBMS operators such as Scans, Joins and aggregations. The example update logic implementation may include scanning from one temporary table to another temporary table. To implement the iteration logic, the described examples add a new simple operator that allows conditional redirection to a previous step in the execution plan. The query planner optimizes the rewritten query just like other queries.

A similar SQL extension to the example embodiments is described in a paper by Sofoklis Floratos, et al. entitled "SQLoop: High Performance Iterative Processing in Data Management" (2018 IEEE 38th International Conference on Distributed Computing Systems (ICDCS), IEEE, 1039-1051). While the syntax of this extension is the same, the system described in this paper is significantly different as it is implemented externally to SQL and has the drawbacks of a middleware approach, described above.

The materials below describe implementation of a Page Rank (PR) query as an example of an iterative CTE. For this computation, all edges of a graph are stored in a relation named "Edges" that has three attributes, source (SRC), destination (DST) and weight. Each tuple in that relation can be mapped to a graph as an edge that goes from node SRC to node DST and that has an assigned weight number. Because recursive queries do not allow aggregation operations in the recursive part, recursive views and recursive CTEs cannot be used to express general-purpose iterative computations such as the PR query. The described example embodiments of iterative CTEs avoid this problem because they implement a termination condition explicitly defined by the user. Accordingly, the iterative CTEs can support more generic iterative computations and aggregation operations can be used in the iterative part of the query.

Before describing iterative CTEs, it is useful to describe implementation of a PR query using a custom SQL based application as shown in TABLE 1.

TABLE 1

Line 1: --Create tables
Line 2: CREATE TABLE IntermediateTable (node int,
Line 3: rank float, delta float);
Line 4: CREATE TABLE Page Rank (node int,
Line 5: rank float,delta float);
Line 6:
Line 7: --Non iterative Query
Line 8: INSERT INTO PageRank
Line 9: SELECT SRC, 0, 0.15
Line 10: FROM ( SELECT SRC FROM edges
Line 11: UNION SELECT DST FROM edges);
Line 12:
Line 13: --Iteration 1
Line 14: DELETE FROM IntermediateTable;
Line 15:
Line 16: INSERT INTO IntermediateTable
Line 17: SELECT PageRank.node,
Line 18: PageRank.rank + PageRank.de Ita,
Line 19: 0.85 * SUM(IncomingRank.delta
Line 20: * IncomingEdges.Weight)
Line 21: FROM PageRank
Line 22: LEFT JOIN edges AS IncomingEdges
Line 23: ON PageRank.node = IncomingEdges.dst
Line 24: LEFT JOIN PageRank AS IncomingRank
Line 25: ON IncomingRank.node =
Line 26: IncomingEdges.src TABLE 1-continued

```
Line 27: GROUP BY PageRank.node;
Line 28:
Line 29: UPDATE PageRank
Line 30: SET rank = IntermediateTable.rank,
Line 31: delta = IntermediateTable.delta
Line 32: FROM IntermediateTable
Line 33: WHERE PageRank.node =
Line 34: IntermediateTable.node;
Line 35:
Line 36: --Iteration 2
Line 37: . . .
```

This PR query includes multiple SQL statements. Lines 1 to 5 create the main and working tables. Lines 7-11 execute the non-iterative part and lines 14 to 34 execute the iterative part of the query once. Then, the iterative part needs to be executed again for N number of iterations by copying lines 14 to 34 N times. Part of the iterative computation is to update the page rank result at lines 29-34. This solution works if N is known, which is not always the case.

The example embodiments implement iterative CTEs that address the problems mentioned above by allowing a SQL programmer to describe the iterative computation and explicitly define its termination condition. An example CTE, R, contains a non-iterative part, $R_0$, and an iterative part, $R_1$. As in recursive CTEs, $R_0$ is executed only once, while $R_1$ is executed multiple times. A major difference between the two SQL structures is that iterative CTEs update the working table instead of adding new tables. Moreover, the query terminates when the termination condition $T^C$ is satisfied. This gives the user the flexibility to define explicit termination conditions and removes the assumptions for fix point semantics. Thus, aggregate functions can be used in $R_1$. The general form of an iterative CTE is:

WITH ITERATIVE R AS($R_0$ITERATE $R_1$UNTIL $T^C$)$Q_F$

Implementing iterative queries for a relational database management system (RDBMS) modifies the functional rewrite processes of the RDBMS by adding either a rename operation or an Update operation at the end of an iterative part of the query. The rename operation swaps memory used by a main table with the memory used by a working table and is used when the iterative part modifies all rows of the working table. The Update operation is used when the iterative part modifies less than all of the rows of the working table and transfers those rows to the main table. The functional rewrite also adds operations to execute the iterative part again when a termination condition is not met and to terminate the iterative part when the termination condition is met.

An example execution flow 100 of the general form iterative CTE is illustrated in FIG. 1. At the beginning, the iterative CTE executes $R_0$ and stores the result into the main CTE table 102. Then, for each iteration of the CTE, the flow 100 a) executes $R_1$ and stores the result in the working table 104, b) updates the main CTE table 102 with the rows that exist in the working table, and c) determines whether $T^C$ is satisfied in order to ascertain whether to perform another iteration. The flow 100 uses a unique row key/identifier to ensure that the main CTE table 102 is updated correctly. If a primary key is specified by the user, the flow 100 uses it to perform the update, otherwise the flow 100 creates unique row IDs. Moreover, the flow 100 generates a run-time error (not shown) if the user defines a CTE in which the iterative part results in the working table 104 having duplicates of a single row. This error message is generated because the flow 100 may not be able to handle two (or more) updates for the same row in the main CTE table 102. In this instance, the user may rewrite the query to re-define the iterative part and explicitly specify how to resolve duplicates using an aggregation operation, a Group By operation, or other SQL operation. After the completion of last iteration of the iterative part, $R_1$, (e.g., when the termination condition, $T^C$, is satisfied) the system performs the query, $Q_F$, and returns the final result to the client computer.

TABLE 2 shows an example iterative CTE, PageRank, that implements PR for all pages.

TABLE 2

```
Line 1: WITH ITERATIVE PageRank(Node, Rank, Delta)
Line 2: AS ( SELECT SRC, 0, 0.15
Line 3: FROM ( SELECT SRC FROM edges
Line 4: UNION SELECT DST FROM edges)
Line 5: ITERATE
Line 6: SELECT PageRank.node,
Line 7: PageRank.rank + PageRank.de Ita,
Line 8: 0.85 * SUM(IncomingRank.delta
Line 9: * IncomingEdges.Weight)
Line 10: FROM PageRank
Line 11: LEFT JOIN edges AS IncomingEdges
Line 12: ON PageRank.node = IncomingEdges.dst
Line 13: LEFT JOIN Page Rank AS IncomingRank
Line 14: ON IncomingRank.node =
Line 15: IncomingEdges.src
Line 16: GROUP BY PageRank.node
Line 17: UNTIL 10 ITERATIONS)
Line 18: SELECT Node, Rank FROM PageRank;
```

In the example shown in TABLE 2, lines 2-4 correspond to the non-iterative part, $R_0$, and lines 5-17 correspond to the iterative part, $R_1$. Line 17 corresponds to the termination condition, $T^C$, which terminates the iterative part, $R_1$, after 10 iterations. PageRank is the main CTE table 102 and IncomingEdges is the working table 104. After the last iteration, the result is returned as shown by line 18 as the tuple (Node, Rank).

TABLE 3 and FIGS. 3-6 describe a native implementation of iterative CTEs in the context of an MPPDB. The example implementations inside the MPPDB, apply execution flows similar to the flows used by external solutions but without using the DDL and DML operations that add Creates, Inserts, and Updates. The Insert logic is implemented through the materialization of intermediate results. Materialization of intermediate results is a common execution operator in many RDBMSs and is used to store results of intermediate join and aggregate operations. Updating the main table from the intermediate table can also be implemented through another materialization with the proper selection of old and new values.

TABLE 3 illustrates the abstract description of the logical plan for the PageRank CTE shown in TABLE 2. The planner uses this logical plan to produce the actual physical plan for the execution engine, similar to what happens with other more traditional SQL structures.

TABLE 3

| Step ID | Description |
| --- | --- |
| 1 | Materialize PageRank with the results of the union operation between the selection of SRC and DST from table edges. |
| 2 | Initialize counter to zero. |
| 3 | Materialize Intermediate_Results with the results of the join between PageRank with edges and then with the results of self-join with PageRank using GROUP BY in attribute nodes |
| 4 | Rename IntermediateRe suits to PageRank. |

TABLE 3-continued

| Step ID | Description |
| --- | --- |
| 5 | Increment counter by 1. |
| 6 | Go to step 3 if counter <10. |

In this logical plan, Step 1 inserts the non-iterative part into a temporary result called PageRank. This can be done by using a regular WITH SQL object. Step 2 initializes a counter to zero. Step 3 executes the iterative part that computes the page rank using ranks from the neighbor pages and connections from the edges table. It is noted that the main table, PageRank, is both an input table and an output table. For this reason, the implementation shown in TABLE 3 uses the intermediate table, Intermediate Results, to hold the values. If the query updates the entire dataset then, Step 4 of the example implementation renames the Intermediate_Results table to PageRank, the name of the main table to avoid unnecessary data movement. The Rename operation is a new operation added to MPPDB to implement iterative CTEs. Step 5 increments the counter by 1. Steps 2 and 5 are new statements added to the execution engine to implement the loop function. These statements are supported by other parts of the system. Supporting general iterative processing in MPPDB involves extensions to the parser, rewrite subsystem, planner and execution engine.

Figure 2:
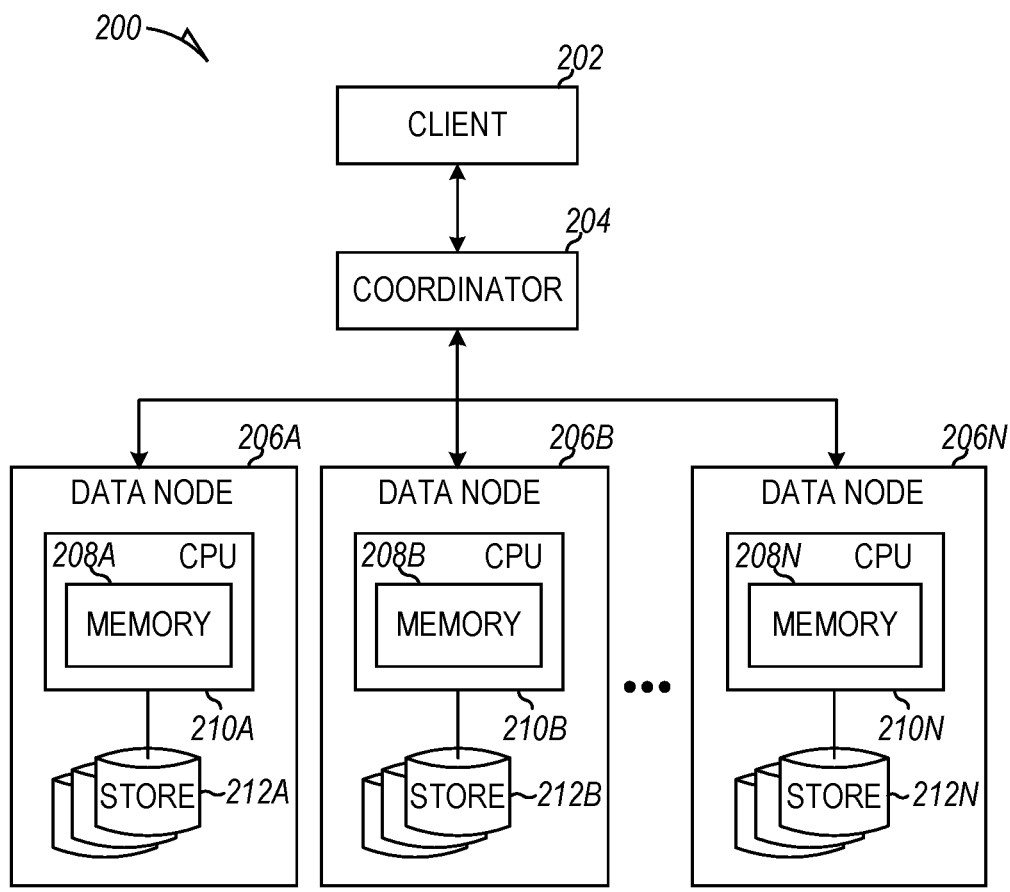
FIG. 2 is a block diagram of a Massively Parallel Processing Database (MPPDB) according to an example embodiment.

FIG. 2 illustrates an example MPPDB 200 that process SQL queries of a client 202. As shown, the MPPDB 200 comprises a coordinator 204 communicatively coupled to the client 202 and to a multiple data nodes 206A-206N. Although FIG. 2 shows three data nodes, the MPPDB typically includes many more data nodes. The coordinator 204, an example of which is described below with reference to FIG. 3, may be any device configured to process and execute queries on behalf of the client 202. Executing such queries may involve developing an execution plan including one or more local plan segments that outline processing flows for the data nodes 206A-206N. The data nodes 206A-206N may be any components having access (e.g., exclusive access) to a partition of the MPPDB 200. The data nodes 206A-206N may be configured to optimize the execution plan and/or corresponding segments of the execution plan, and thereafter to execute corresponding plan segments using the data in their data stores 212A-212N to produce a query result.

The data nodes 206A, 206B, and 206N include respective central processing units (CPUs) 210A, 210B, and 210N. Each CPU is coupled to a respective memory 208A, 208B, and 208N. The data nodes 206A-206N also include data stores 212A, 212B, and 212N, which hold the data accessed by respective portions of the query processed by the respective data nodes 206A, 206B, and 206N. The CPUs 210A, 210B, and 210N, may store instructions for in the respective memories 208A, 208B, and 208N for processing the local plan segments to implement the query using data in the segment of the data stores 212A, 212B, and 212N, assigned to the respective CPUs 210A, 210B, and 210N. These instructions may further rewrite and/or optimize the local plan segments, for example, in response to the cardinality of the tables in each of the data stores 212A, 212B, and 212N.

Figure 3:
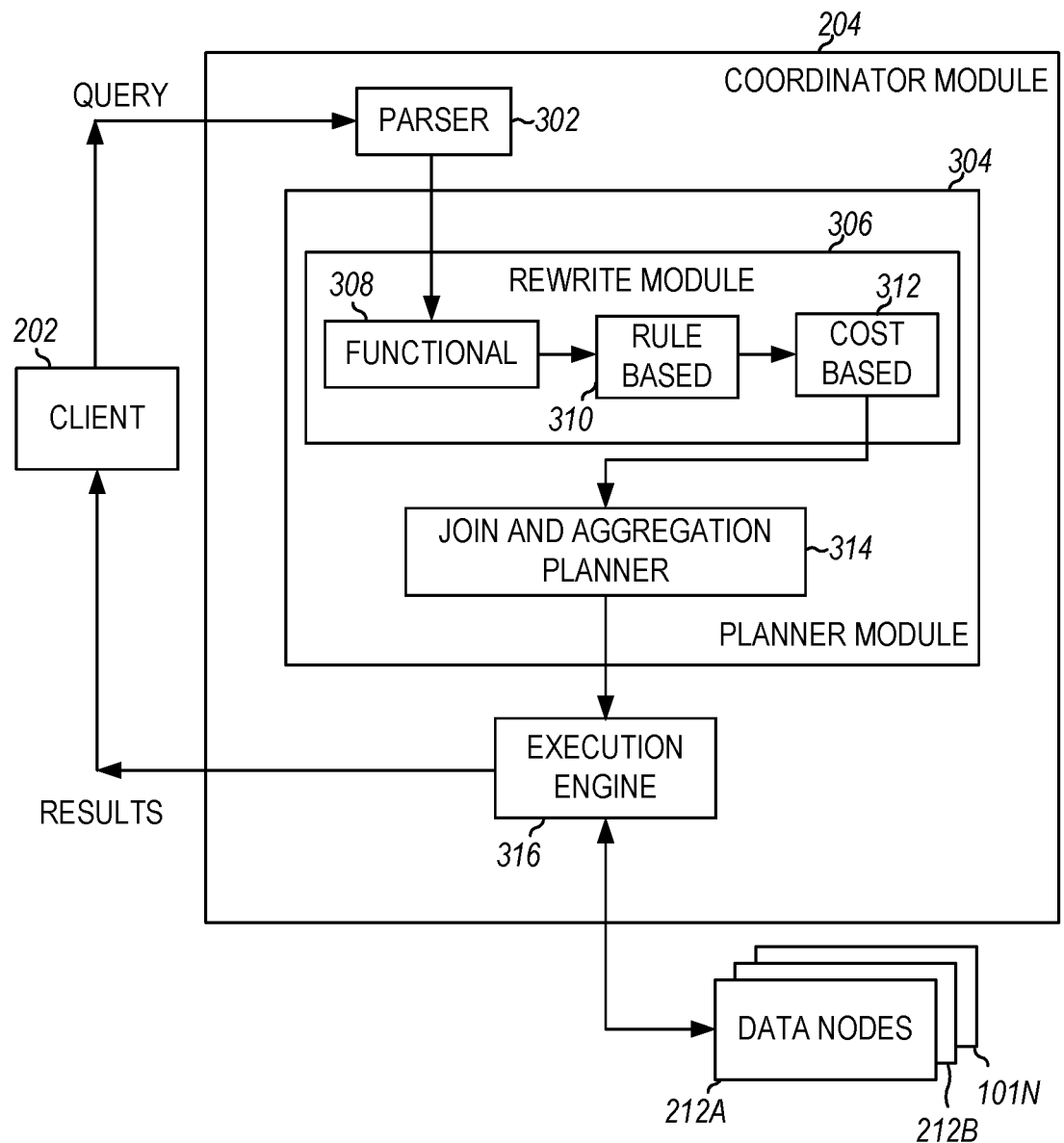
FIG. 3 is a block diagram showing details of a coordinator module according to an example embodiment.

FIG. 3 shows an example coordinator 204 that illustrates the overall processing flow of SQL queries in the system. As shown in FIG. 2, the coordinator 204 receives a query from a client 202 and provides the results of query execution to the client 202. The example coordinator 204 includes a parser 302, a planner module 304, and an execution engine 316. The planner module 304, in turn, includes a rewrite module 306 and a join and aggregation planner 314. The rewrite module 306 implements three types of rewrite operations implemented by respectively different sections of the rewrite module 306. These sections include a functional rewrite section 308, a rule-based optimization section 310 and a cost-based optimization section 312. The execution engine 316 executes a physical plan provided by the planner module 304 using data in the data stores 212A, 212B, and 212N.

The parser 302 handles the syntax, semantics and access rights for the SQL query. The parser 302 outputs a logical query tree, in parse tree format, and passes the logical query tree to the rewrite module 306 of the planner module 304. The rewrite module 306 performs functional rewrites and optimization rewrites on the query tree. The functional rewrite section 308 transforms some operators not supported by the execution engine to other low level operators. Common examples are view reference expansion (plugging view definitions into the query tree) and transforming complex OLAP functions, such as Cube or Rollup, to a Union of simple aggregate queries. In the examples described below, the functional rewrite section 308 adds operators to implement the termination and loop operations of the iterative CTE. The rule-based optimization section 310 and the cost-based optimization section 312 of the rewrite module 306 operate on the modified logical plan generated by the functional rewrite section 308 to produce an optimized query plan tree. Examples of optimization rewrites include Predicate Push Down, Union simplification, and Join elimination, among others.

The join and aggregation planner 314 converts the logical tree provided by the rewrite module 306 to a physical tree that includes Join ordering and implementation, aggregation methods and data shuffle decisions. The join and aggregation planner 314 generates the execution plan using LLVM optimizations and passes the generated execution plan to the execution engine 316. The LLVM optimizations transform the query plans provided by the join and aggregation planner 314 into architecture-independent intermediate code, optimize the intermediate code for the execution engine 316, and compile the optimized code to produce the execution plan for the execution engine 316. The acronym "LLVM" originally stood for Low-Level Virtual Machine. However, LLVM has evolved such that this meaning is no longer appropriate.

During the final step of query processing, the execution engine 316 performs the actual query execution and returns the results to the client 202. The example embodiments extend the components of the MPPDB to process iterative CTEs. These modifications, however, do not introduce major alternations to the code base such that the modified MPPDB is backward compatible with existing SQL programs.

The parser 302 is changed to accommodate the new syntax introduced by iterative CTEs and to produce new parse tree nodes containing information for the execution of the iterative and non-iterative parts of the query and to extract information regarding the termination condition (e.g., the loop Type and any expression to be evaluated for the termination condition). The parser 302 performs similar operations to the parser in the above referenced article by S. Floratos, et al.

The functional rewrite section 308 of the rewrite module 306 is modified to add a rewrite rule to transform iterative CTEs into lower level operations. This rule translates functions similar to those described above with reference to steps 2, 4, 5, and 6 of TABLE 2. These modifications are described in more detail below. The changes to the rule-based optimization section 310 and cost-based optimization section 312 of the rewrite module 306 implement rule and cost-based optimizations that can be applied without further modification of the logical query tree produced by the functional rewrite section 308 of the rewrite module 306.

The join and aggregation planner 314 has a minor modification to recognize and pass, to the physical plan, two execution operators, described below, that accommodate loop and rename functionality. The execution engine 316 is extended to implement these execution operators. These modifications are relatively minor and do not significantly affect the execution engine 316 as the rewritten query plan is based on existing RDBMS operators.

The functional rewrite section 308 of the rewrite module 306 expands the parse tree generated by the parser 302 into a sequence of SQL operators that cover the non-iterative part, the iterative part and the loop logic. The loop logic repeats the iterative part of the query until the termination condition $T^C$ is met.

Figure 4:
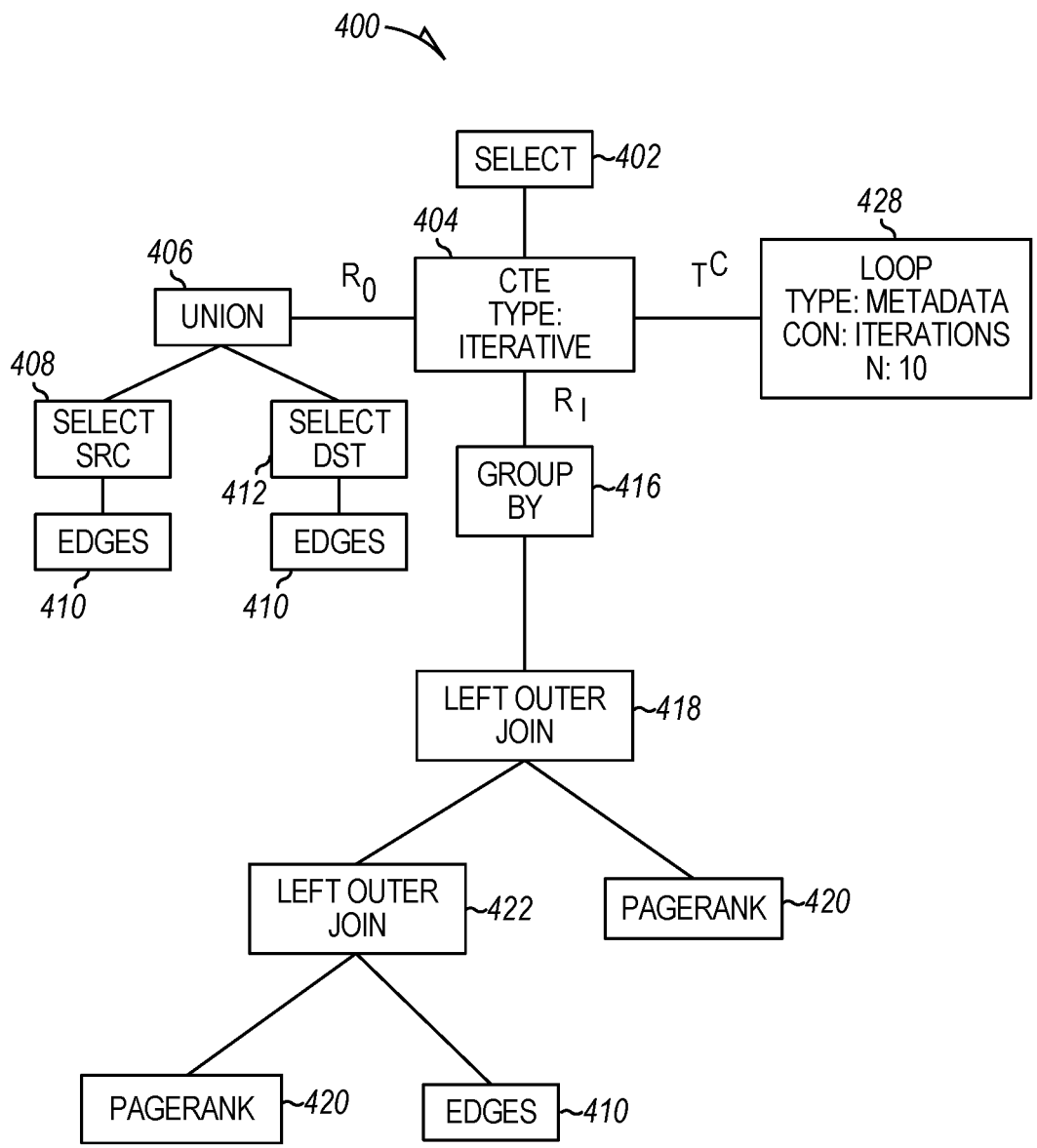
FIG. 4 is a tree diagram showing a query tree for a page rank query according to an example embodiment.

FIG. 4 shows a parse tree 400 for the iterative CTE PageRank query in TABLE 2 produced by the parser 302. FIG. 4 does not show the full detailed tree but focuses on the main nodes that implement the operators. The root of the parse tree 400 is a Select operation 402 that selects rows for the iterative CTE PageRank. Node 404 of the parse tree 400 marks the CTE as "iterative" to differentiate it from regular and recursive CTEs. The parser 302 generates separate sub-trees for the non-iterative part, the iterative part, and the Loop part, including the termination condition. The root of the non-iterative sub-tree is a Union operation 406 of two Select operations 408 and 412. Select operation 408 extracts the SRC nodes from the Edges table 410 and Select operation 412 selects the DST nodes from the Edges table 410. The root node of the iterative subtree is a Group By operation 416. The Group By operation 416 operates on the result of a first Left Outer Join operation 418, which joins the PageRank table 420 with the result of a second Left Outer Join operation 422 that joins the PageRank table 420 and the SRC nodes of the Edges table 410. The Loop sub-tree 428 describes the termination condition based on "UNTIL 10 ITERATIONS" in line 17 of table 2. This statement is parsed to indicate that the loop type is "Metadata," where the condition (CON) is "Iterations" and the number of iterations is 10.

Figure 5:
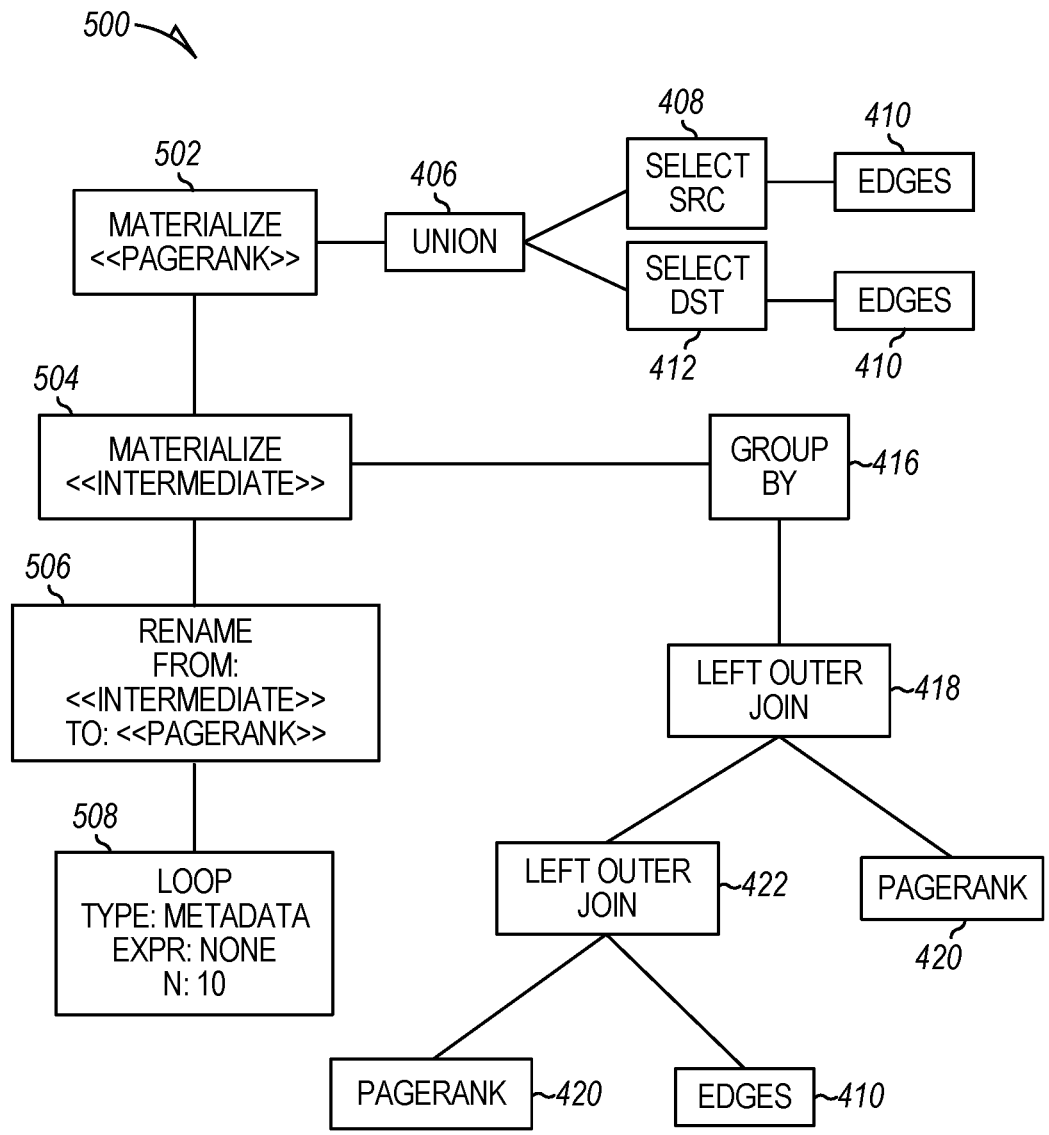
FIG. 5 is a tree diagram showing a query tree for the page rank query functionally rewritten according to an example embodiment.

The functional rewrite section 308 of the rewrite module 306 expands the parse tree 400 into a sequence of regular SQL operations that implement the iterative CTE shown in Table 2 and FIG. 4. FIG. 5 illustrates the result of the rewrite that is a logical plan tree 500 that represents the logical query plan generated by the planner module 304 of the MPPDB 200 after processing the parse tree 400 shown in FIG. 4. Note that the logical plan shown in FIG. 5 is a simplified version, used for demonstration purposes. This rewrite converts the node 404 shown in FIG. 4 into two materialize operations 502 and 504 and a Rename operation 506. The first materialize operation 502 materializes the PageRank table 420 and implements the non-iterative sub-tree of the parse tree 400 shown in FIG. 4 which initializes the PageRank table to include the SRC and DST nodes of the Edges table 410. This sub-tree includes the Union operation 406, and the Select operations 408 and 412, which select the SRC and DST nodes from the Edges table 410 as described above with reference to FIG. 4. The second materialize operation 504 materializes an intermediate table and includes the Group By operation 416 and Left Outer Join operations 418 and 422 that operate on the PageRank table 420 and the Edges table 410, as described above with reference to FIG. 4. The last operation of the expanded node 404 is a Rename operation 506 that renames the intermediate table to be the main PageRank table 420. As described below, for queries that do not update the entire dataset, this step may be replaced by an Update operation that selects the old values from the PageRank table 420 and the new values from intermediate table using the column that serves as a unique row identifier.

Node 508 of the logical plan tree 500 implements the loop operation of the iterative CTE. One element of this implementation is to determine when the termination condition is satisfied. As described above, the termination condition can be based on data, metadata, or delta values. A termination condition based on data includes an expression that can be implemented using SQL. For example, the MPPDB may determine a number of tuples that satisfy the expression in the main CTE table, after the main CTE table has been updated or after the intermediate table has been renamed to become the main CTE table, and terminate the loop based on the determination. A termination based on metadata can be based on number of iterations or updates applied to the main CTE table up to and including the most recent iteration. A loop Type of Delta may be based on delta values (e.g., values from the current iteration compared to values from a previous iteration). A loop of Type Delta terminates the query based on a comparison of the results of a current iteration to results of a previous iteration using a SQL expression specified by the user.

The implementation of the iterative part in the functional rewrite depends on the loop type that is identified by the parser variable Type shown in FIGS. 4 and 5. The value of the Type variable is passed to the planner module 304 through the new iterative CTE object. There are two options for implementing the termination logic. First, infrastructure already exists in the MPPDB to indicate the next operator of a given query plan node in the execution flow. The first option extends this infrastructure to be conditional, such that the next operator can be the selected from the start of the loop or the end of the query. This option does not introduce a new operator but may complicate the execution flow for the general case since the execution of the logic would be modified to always check whether the next operator is conditional.

A less intrusive way to implement the iterative CTE is to introduce a Loop operator that handles the conditional execution flow explicitly. When the functional rewrite section 308 of the rewrite module 306 determines that the parse tree is an iterative CTE, it adds the loop operator in the logical plan tree as shown by node 508 of FIG. 5. Next, the functional rewrite section 308 of the rewrite module 306 provides the information used by the specified loop Type from the parse tree. The new operator captures three pieces of information: 1) the loop Type (Metadata, Data, or Delta), 2) the number of iterations in the iteration option or expression updates in the update option with an indicator to distinguish between the two options and 3) the SQL expression used for the Data and Delta loop Types. The new operator also captures an extra indicator that accommodates the Any keyword, as described in the above referenced article by S. Floratos, et al. For the PageRank CTE plan tree shown in FIG. 5, the query explicitly uses 10 iterations, thus the termination condition is based on metadata.

The loop operator in the logical query plan tree is populated with <<Type:metadata, N:10, Expr:NONE>> as shown in node 508.

The last change implemented by the functional rewrite section 308 of the rewrite module 306 is to add an operation to initialize the loop operator right after the execution of the non-iterative part and to update the loop operator at the end of each iteration. For the simple case of the PageRrank iterative CTE, MPPDB starts a new counter (step ID 2 in TABLE 3) before the execution of $R_1$ and then increment the counter (step ID 5 in TABLE 3) before checking if another iteration is needed (step ID 6 in TABLE 3).

Figure 6:
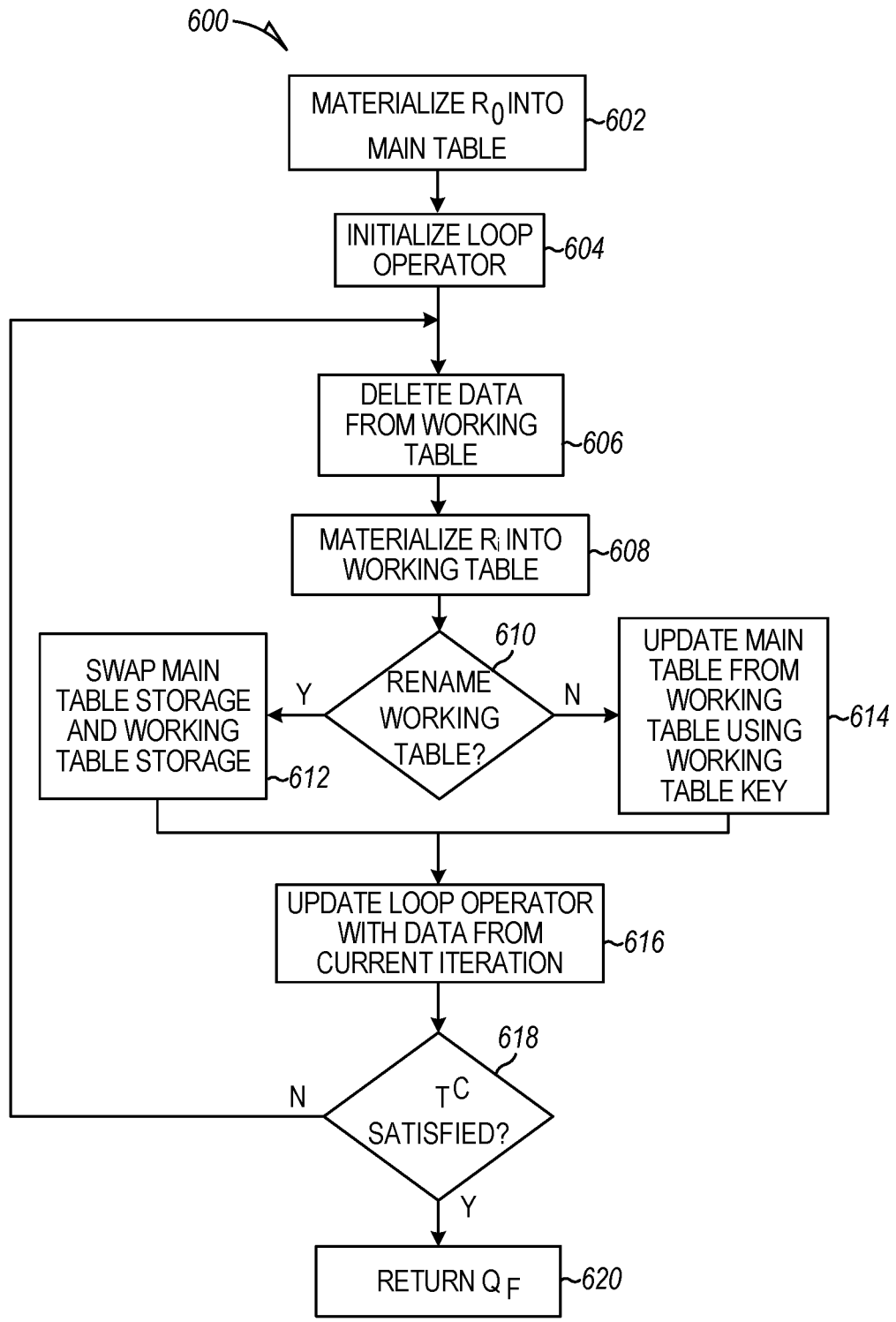
FIG. 6 is a flow-chart diagram illustrating the operation of a functional rewritten iterative database construct according to an example embodiment.

FIG. 6 shows a generic algorithm 600 used by the planner of MPPDB, which illustrates the functional rewrite of the iterative CTE. This algorithm is not limited to a PR calculation and provides a framework for rewriting plan trees for any query implemented using an iterative CTE. Operation 602 materializes $R_0$, the non-iterative part of the CTE, into the main table. Operation 604 initializes the loop operator. This operation has different functions depending on the Type of the loop operator. When the Type is "Metadata," operation 604 initializes a counter to count the number of iterations. When Type is "Data," operation 604 initializes the loop operator with the function to be evaluated to determine whether the termination condition $T^C$ has been met.

Operation 606 deletes the data from all rows of the working table and operation 608 materializes the working table as $R_1$, the iterative part of the CTE. This operation may include an SQL Delete operation. Operation 610 is executed at the end of each iteration and determines how updates to the main table are to occur. As described above, when operation 608 updates the entire working table, the main table is updated by switching the main and temporary tables, which may be implemented by operation 612 that swaps the storage space (e.g., the memory and disk storage) between the temporary table and the main table. This operation effectively renames the temporary table to the main table and renames the main table to the temporary table. Operation 612 may also delete any data from the rows of the working table. In this instance, operation 606 may be omitted or may be performed only once, before the first materialization of data into the working table. Alternatively, when operation 610 determines that operation 608 modifies only a subset of the rows of the working table, operation 614 executes multiple Update operations to copy rows from the working table to the main table, where the copied rows are identified by the working table key. For example, operation 610 determines that operation 608 changes only a subset of the working table when operation 610 detects a WHERE clause in $R_1$.

Following operation 612 or operation 614, operation 616 updates the loop operator with data from the current iteration. As with operation 604, operation 616 performs different functions based on the Type of the loop. When Type is Metadata, operation 616 increments the counter, when Type is Data, operation 616 evaluates the function, and when Type is Delta, operation 616 updates the loop operator based on a difference between the results of the current iteration and the results of a previous iteration according to the user-specified SQL expression.

When the loop Type is Delta, the results of the previous iteration may be stored in a delta table. The storage of the previous results in the delta table occurs differently depending on whether the previous iteration executed operation 612 or operation 614. When operation 612 of the previous iteration swapped the main and working tables, the current iteration stores the renamed main table in the delta table at the start of the current iteration or at the end of the previous iteration. When operation 614 of the previous iteration updated the main table from the working table, the contents of the main table and the working table are the same prior to operation 606 of the current iteration. In this instance, the algorithm 600 renames the working table to be the delta table and operation 606 generates a new empty working table. Alternatively, the current iteration may compare the main and working tables to update the loop operator (operation 616) before swapping the main table with the working table in operation 612 or updating the main table from the working table in operation 614. This avoids storing a separate delta table.

After operation 616, operation 618 determines whether the termination condition, $T^C$, has been met. When $T^C$ has not been met, operation 618 branches to operation 606 to begin the next iteration. When $T^C$ has been met, operation 620 returns the result, $Q_F$, of the iterative CTE. As an alternative to the method shown in FIG. 6, the loop operations 616, 618, and 620 may be moved before operation 606 such that operation 616 updates the loop operator with data from the previous iteration and, when $T^C$ is not satisfied, continues to operation 606. In this alternative method, an unconditional branch operation (not shown) to the moved operation 616 is inserted after operations 612 and 614.

Figure 7:
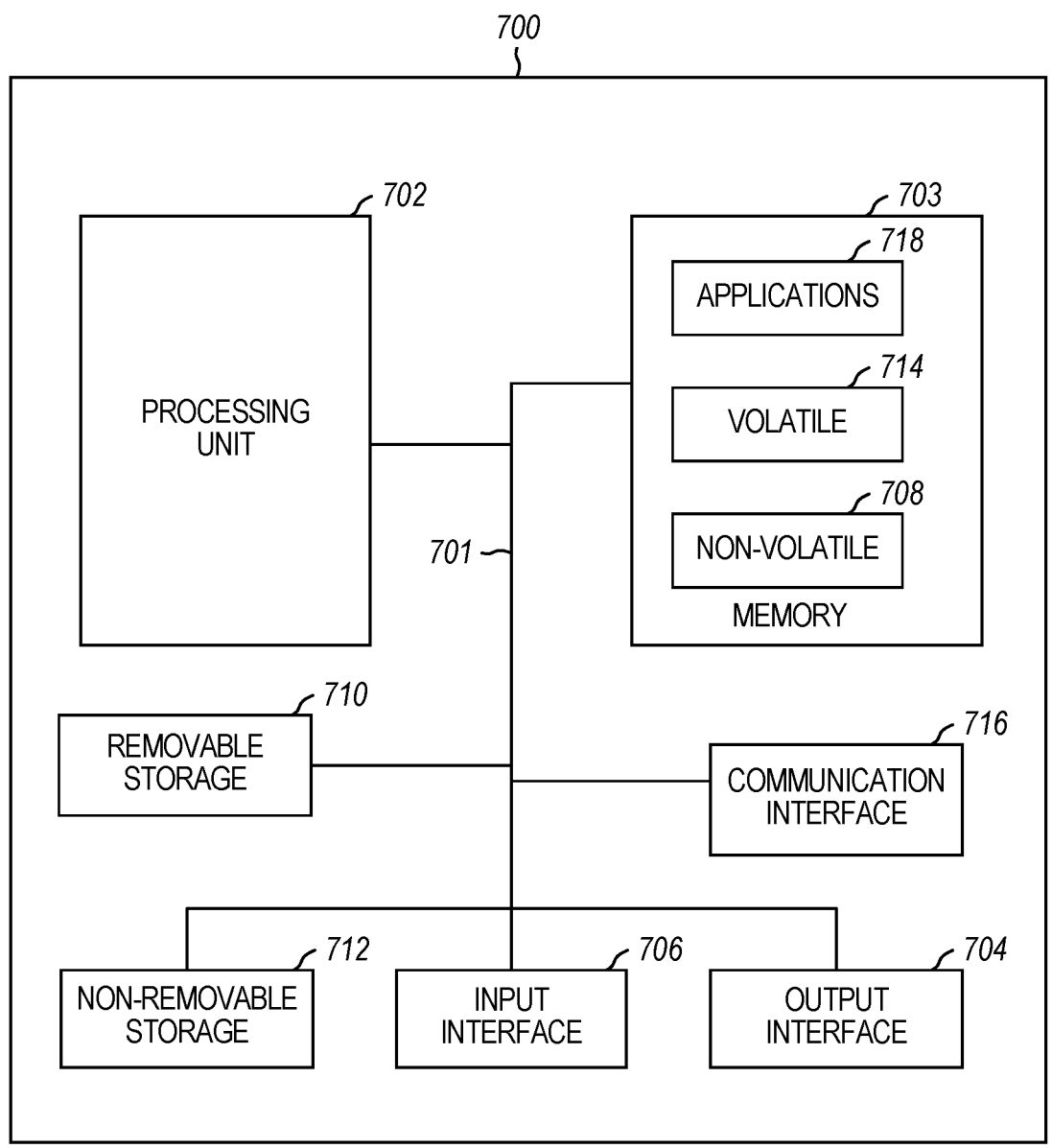
FIG. 7 is a block diagram of a processing system according to an example embodiment.

FIG. 7 is a block diagram of a computing device 700 according to an embodiment. Similar components may be used in the example computing devices described herein. For example, the clients, servers, and network resources may each use a different set of the components shown in FIG. 7 and/or computing components not shown in FIG. 7. Computing devices similar to computing device 700 may be used to implement the client 202, coordinator 204, and data nodes 206A-206N shown in FIG. 2; the coordinator, shown in FIG. 3; to implement the method shown in FIG. 6; and to process the queries described in TABLES 2 and 3 to generate the flow trees shown in FIGS. 4 and 5.

One example computing device 700 may include a processing unit (e.g., one or more processors and/or CPUs) 702, memory storage 703, removable storage 710, and non-removable storage 712 communicatively coupled by a bus 701. Although the various data storage elements are illustrated as part of the computing device 700, the removable storage 710 may also or alternatively include storage in one of the data stores 212A-212N, shown in FIG. 2 coupled to the processing unit 702 by a high-speed data interface (not shown).

Memory storage 703 may include volatile memory 714 and non-volatile memory 708. Memory storage 703 may also include applications 718 such as the coordinator 204 described above with reference to FIGS. 2 and 3. Computing device 700 may include or have access to a computing environment that includes a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM), electrically erasable programmable read-only memory (EEPROM), flash memory or other memory technologies, compact disc read-only memory (CD-ROM), digital versatile disk (DVD) or other optical disk storage devices, magnetic cassettes, magnetic tape, magnetic disk storage or other magnetic storage devices, or any other medium capable of storing computer-readable instructions.

Computing device 700 may include or have access to a computing environment that includes input interface 706, output interface 704, and communication interface 716. Output interface 704 may provide an interface to a display device, such as a touchscreen, that also may serve as an input device. The input interface 706 may provide an interface to one or more of a touchscreen, touchpad, mouse, keyboard, camera, one or more device-specific buttons, one or more sensors integrated within or coupled via wired or wireless data connections to the server computing device 700, and/or other input devices. The computing device 700 may operate in a networked environment using a communication interface 716. The communication interface may include one or more of an interface to a local area network (LAN), a wide area network (WAN), a cellular network, a WLAN network, and/or a Bluetooth® network.

In an example embodiment, the computing device 700 includes a query reception module receiving a first iterative query having a first non-iterative part that defines a first main table and a first iterative part that generates values in rows of a first working table based on values in rows of the first main table, a modification determination module determining that the first iterative part modifies all of the rows of the first working table, a rename module adding a renaming operation to rename the first working table to a name of the first main table to produce a new first main table and to rename the first main table to a name of the first working table to produce a new first working table, a delete module adding a first Delete operation to delete each row of the new first working table, and a loop module adding a first loop operation to repeat the first iterative part until a first termination condition is met. In some embodiments, the computing device 700 may include other or additional modules for performing any one of or combination of steps described in the embodiments. Further, any of the additional or alternative embodiments or aspects of the method, as shown in any of the figures or recited in any of the claims, are also contemplated to include similar modules.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. As described herein, a module can comprise one or both of hardware or software that has been designed to perform a function or functions (e.g., one or more of the functions described herein in connection with providing secure and accountable data access).

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of the steps of the disclosure can be installed in and provided with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments and capable of being practiced or carried out in various ways. Also, it will be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The components of the illustrative devices, systems, and methods employed in accordance with the illustrated embodiments can be implemented, at least in part, in digital electronic circuitry or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, method, object, or another unit suitable for use in a computing environment. A computer program can be deployed to be executed on one computer or on multiple computers at one site or distributed across multiple sites and interconnected by a communication network. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, for example, as an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a single core or multi-core microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer include a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, for example, electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable storage medium") means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. A machine-readable medium or computer-readable storage medium shall also be taken to include any medium (or a combination of multiple media) that is capable of storing instructions for execution by one or more processors, such that the instructions, when executed by one or more processors, cause the one or more processors to perform any one or more of the methodologies described herein. Accordingly, a machine-readable medium or computer-readable storage medium refers to a single storage apparatus or device, as well as "cloud-based" storage systems or storage networks that include multiple storage apparatus or devices. The terms "machine-readable medium" and "computer-readable storage medium" as used herein exclude signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described with reference to specific features and embodiments thereof, it is evident that various modifications and combinations can be made thereto without departing from the scope of the disclosure. For example, other components may be added to, or removed from, the described methods, modules, devices, and/or systems. The specification and drawings are, accordingly, to be regarded simply as an illustration of the disclosure as defined by the appended claims, and are contemplated to cover any and all modifications, variations, combinations or equivalents that fall within the scope of the present disclosure. Other aspects may be within the scope of the following claims.

What is claimed is:

1. A method for functionally rewriting iterative queries for a relational database management system (RDBMS), the method comprising:
   receiving a first iterative query, the first iterative query having a first non-iterative part that defines a first main table and a first iterative part that generates values in rows of a first working table based on values in rows of the first main table;
   determining that the first iterative part modifies all of the rows of the first working table; and
   rewriting the first iterative part including:
      adding a renaming operation to rename the first working table to a new first main table and to rename the first main table to a new first working table;
      adding a first delete operation to delete each row of the new first working table; and
      adding a first loop operation to repeat the first iterative part until a first termination condition is met.

2. The method according to claim 1, wherein:
   the adding of the first loop operation includes adding a first comparison operation and a first branch operation as last operations in the first iterative part;
   the first comparison operation is configured to test the first termination condition; and
   the first branch operation is configured to:
      conditionally branch to a first operation in the first iterative part when the first comparison operation determines that the first termination condition is not met; and
      terminate the first iterative part when the first comparison operation determines that the first termination condition is met.

3. The method according to claim 2, wherein the rewriting of the first iterative part includes adding the first renaming operation and the first delete operation immediately before the first comparison operation.

4. The method according to claim 2, wherein:
   the first termination condition includes a number of iterations to be performed by the first iterative part;
   the method further includes rewriting the first non-iterative part to add an operation to initialize a counter; and
   the adding of the first comparison operation includes adding an operation to compare a value of the counter to the number of iterations.

5. The method according to claim 2, wherein:
   the first termination condition includes an expression to be evaluated by the first iterative part; and
   the adding of the first comparison operation includes adding operations for evaluating the expression to determine whether the first termination condition is met.

6. The method according to claim 2, wherein:
the first termination condition includes a difference measurement between first values of target entries from the first main table for a previous iteration and second values of the target entries from the first main table for a current iteration;
the rewriting of the first iterative part further comprises adding an operator to store the first values of the target entries from the first main table as a first operation of the first iterative part; and
the adding of the first comparison operation includes adding an operation to determine whether a difference between the second values of the target entries from the first main table and the stored first values of the target entries is less than the difference measurement, wherein the first comparison operation determines whether the first termination condition is met.

7. The method according to claim 1, further comprising:
receiving a second iterative query including a second a non-iterative part that defines a second main table and a second iterative part that generates values in rows of a second working table based on values in rows of the second main table;
determining that the second iterative part modifies less than all of the rows of the second working table; and
rewriting the second iterative part including:
adding an update operation, to replace corresponding rows in the second main table with the modified rows from the second working table; and
adding a second delete operation to delete each modified row of the second working table.

8. The method according to claim 7, further comprising:
adding a second comparison operation and a second branch operation as last operations in the second iterative part, wherein:
the second comparison operation is configured to test a second termination condition; and
the second branch operation is configured to:
conditionally branch to a first operation in the second iterative part when the second comparison operation determines that the second termination condition is not met; and
terminate the second iterative part when the second comparison operation determines that the second termination condition is met; and
the rewriting of the second iterative part includes adding the update operation and the second delete operation immediately before the second comparison operation.

9. An apparatus for functionally rewriting iterative queries for a relational database management system (RDBMS), the apparatus comprising:
a memory storing instructions; and
at least one processor in communication with the memory, the at least one processor configured, upon execution of the instructions, to perform the following steps:
receiving a first iterative query, the first iterative query having a first non-iterative part that defines a first main table and a first iterative part that generates values in rows of a first working table based on values in rows of the first main table;
determining that the first iterative part modifies all of the rows of the first working table; and
rewriting the first iterative part including:
adding a renaming operation to rename the first working table to produce a new first main table and to rename the first main table to produce a new first working table;
adding a first delete operation to delete each row of the new first working table; and
adding a first loop operation to repeat the first iterative part until a first termination condition is met.

10. The apparatus according to claim 9, wherein the adding of the first loop operation includes adding a first comparison operation and a first branch operation as last operations in the first iterative part, wherein:
the first comparison operation is configured to test the first termination condition; and
the first branch operation is configured to:
conditionally branch to a first operation in the first iterative part when the first comparison operation determines that the first termination condition is not met; and
terminate the first iterative part when the first comparison operation determines that the first termination condition is met.

11. The apparatus according to claim 10, wherein the operation of rewriting the first iterative part includes adding the first renaming operation and the first delete operation immediately before the first comparison operation.

12. The apparatus according to claim 10, wherein:
the first termination condition includes a number of iterations to be performed by the first iterative part and the operations further include rewriting the first non-iterative part to add an operation to initialize a counter; and
the adding of the first comparison operation includes adding an operation to compare a value of the counter to the number of iterations.

13. The apparatus according to claim 10, wherein:
the first termination condition includes an expression to be evaluated by the first iterative part; and
the adding of the first comparison operation includes adding operations for evaluating the expression to determine whether the first termination condition is met.

14. The apparatus according to claim 10, wherein:
the first termination condition includes a difference measurement between first values of target entries in the first main table for a previous iteration and second values of the target entries from the first main table for a current iteration;
the rewriting of the first iterative part further comprises adding an operator to store the first values of the target entries from the first main table as a first operation of the first iterative part; and
the adding of the first comparison operation includes adding an operation to determine whether a difference between the second values of the target entries from the first main table and the stored first values of the target entries is less than the difference measurement, wherein the first comparison operation determines whether the first termination condition is met.

15. The apparatus according to claim 9, wherein the operations further include:
receiving a second iterative query including a second a non-iterative part that defines a second main table and a second iterative part that generates values of rows of a second working table based on values of rows of the second main table;

determining that the second iterative part modifies less than all of the rows of the second working table; and rewriting the second iterative part including:
   adding an update operation, to replace corresponding rows in the second main table with the modified rows from the second working table; and
   adding a second delete operation to delete each modified row of the second working table.

16. The apparatus according to claim 15, wherein:
the operations further include adding a second loop operation to repeat the second iterative part until a second termination condition is met; and
the rewriting of the second iterative part includes adding the Update operation and the second delete operation immediately before the second loop operation.

17. A non-transitory computer-readable storage medium storing computer instructions for functionally rewriting iterative queries for a relational database management system (RDBMS), that configure at least one processor, upon execution of the instructions, to perform the following steps:
   receiving a first iterative query, the first iterative query having a first non-iterative part that defines a first main table and a first iterative part that generates values in rows of a first working table based on values in rows of the first main table;
   determining that the first iterative part modifies all of the rows of the first working table; and
   rewriting the first iterative part including:
      adding a renaming operation to rename the first working table to produce a new first main table and to rename the first main table to produce a new first working table;
      adding a first delete operation to delete each row of the new first working table; and
      adding a first loop operation to repeat the first iterative part until a first termination condition is met.

18. The computer-readable storage medium according to claim 17, wherein:
the adding of the first loop operation includes adding a first comparison operation and a first branch operation as last operations in the first iterative part; and
the first comparison operation is configured to:
   test the first termination condition; and
the first branch operation is configured to:
   conditionally branch to a first operation in the first iterative part when the first comparison operation determines that the first termination condition is not met; and
   terminate the first iterative part when the first comparison operation determines that the first termination condition is met.

19. The computer-readable storage medium according to claim 17, wherein the operations further comprise:
   receiving a second iterative query including a second a non-iterative part that defines a second main table and a second iterative part that generates values in rows of a second working table based on values in rows of the second main table;
   determining that the second iterative part modifies less than all of the rows of the second working table; and
   rewriting the second iterative part including:
      adding an update operation, to replace corresponding rows in the second main table with the modified rows from the second working table; and
      adding a second delete operation to delete each modified row of the second working table.

20. The computer-readable storage medium according to claim 19, wherein the operations further comprise:
   adding a second comparison operation and a second branch operation as last operations in the second iterative part, wherein:
   the second comparison operation is configured to test a second termination condition;
   the second branch operation is configured to:
      conditionally branch to a first operation in the second iterative part when the second comparison operation determines that the second termination condition is not met; and
      terminate the second iterative part when the second comparison operation determines that the second termination condition is met; and
   the rewriting of the second iterative part includes adding the update operation and the second delete operation immediately before the second comparison operation.

\* \* \* \* \*